J. SPERRY.

Manufacturing Boxes.

No. 8,480. Reissued Nov. 5, 1878.

Attest:
H. H. Schott.
Fred E. Tasker

Inventor:
John Sperry,
per
J. C. Tasker & Co. Attys.

N. PETERS, PHOTO-LITHOGRAPHER, WASHINGTON, D. C.

UNITED STATES PATENT OFFICE.

JOHN SPERRY, OF NEW YORK, N. Y.

IMPROVEMENT IN MANUFACTURING BOXES.

Specification forming part of Letters Patent No. 40,507, dated November 3, 1863; Reissue No. 8,480, dated November 5, 1878; application filed June 17, 1878.

DIVISION A.

*To all whom it may concern:*

Be it known that I, JOHN SPERRY, of New York city, in the county of New York and State of New York, have invented certain new and useful Improvements in Manufacturing Boxes; and I do hereby declare that the following is a full, clear, and exact description of the invention, that will enable others skilled in the art to which it appertains to make and use the same, reference being had to the accompanying drawings, and to the letters of reference marked thereon, which form a part of this specification, similar letters indicating the same parts in the different figures, in which—

Figure 1:
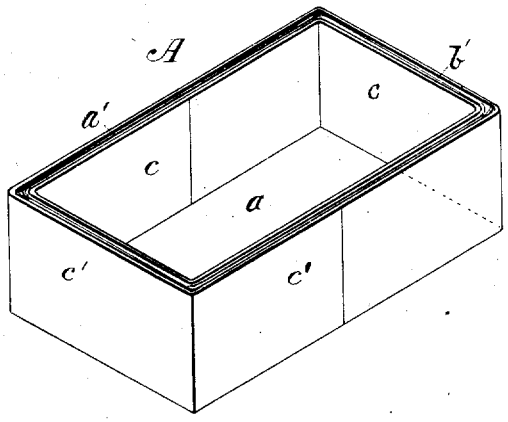
Figure 2:
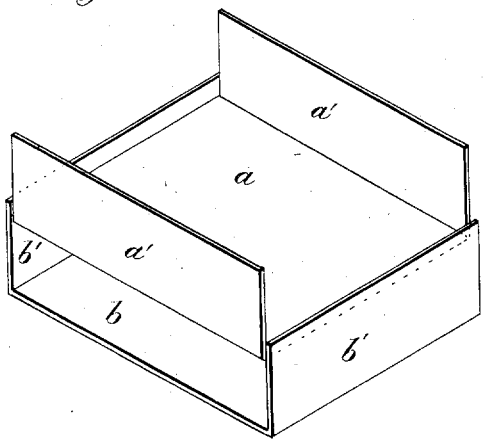

Figure 1 is a perspective view of a box constructed according to my invention. Fig. 2 is a similar view of some of its parts during the process of construction.

The object of this invention is to produce a grain-bound box by combining thin layers of wood in such a manner that the grain of one layer shall run in a different direction to that of the adjacent layer or layers.

The nature of my invention and its advantages will be readily understood from the following description:

In the drawings, A represents the box, which may be square or of any other shape or form. If of rectangular shape, its several parts are combined in the following manner: I take two thin pieces of wood or veneer, *a* and *b*, and turn the end *a'* and *b'* up to correspond to the desired height of the box, and place the part *a* over the part *b*, as shown in Fig. 2 of the drawings, the grain of the bottom *b* running across that of the part *a*. The sides may now be strengthened by the band *c*, placed inside, or band *c'*, placed outside, or two such bands may be used, one inside and the other out. These bands are made of one or more pieces of wood cut to correspond with the inner or outer circumference of the box, and are secured to it by glue or cement.

The grain of the wood comprising the bands *c c'* runs around the box at right angles to that of the sides *a' b'*, and by these means the splitting of the sides is prevented. The bottom may also be further strengthened, if desired, by adding an additional layer of wood or veneer to the part *a* and securing the whole together.

It will be apparent that the spirit of my invention consists in so arranging the piece of wood or veneers forming the box that the grain of the wood in the parts which overlap shall cross, so as to add strength to the box and prevent its injury by the splitting of the material.

Having thus described my invention, I claim as new, and desire to secure by Letters Patent, the following:

1. A grain-bound box made of pieces *a a' b b'* and bands *c*, which are so arranged in relation to each other that the grain of one layer crosses the grain of the adjacent layer, substantially as specified.

2. Making the bottom and the sides of a wooden box either partially or wholly of one or more pieces of material by turning the edges up or in and overlapping the corners, so that the grains of the veneer cross and strengthen the same, substantially as set forth.

In testimony that I claim the foregoing I have hereunto set my hand this 30th day of May, 1878.

JOHN SPERRY.

Witnesses:
E. A. DICK,
JOHN C. TASKER.